Patented Jan. 30, 1951

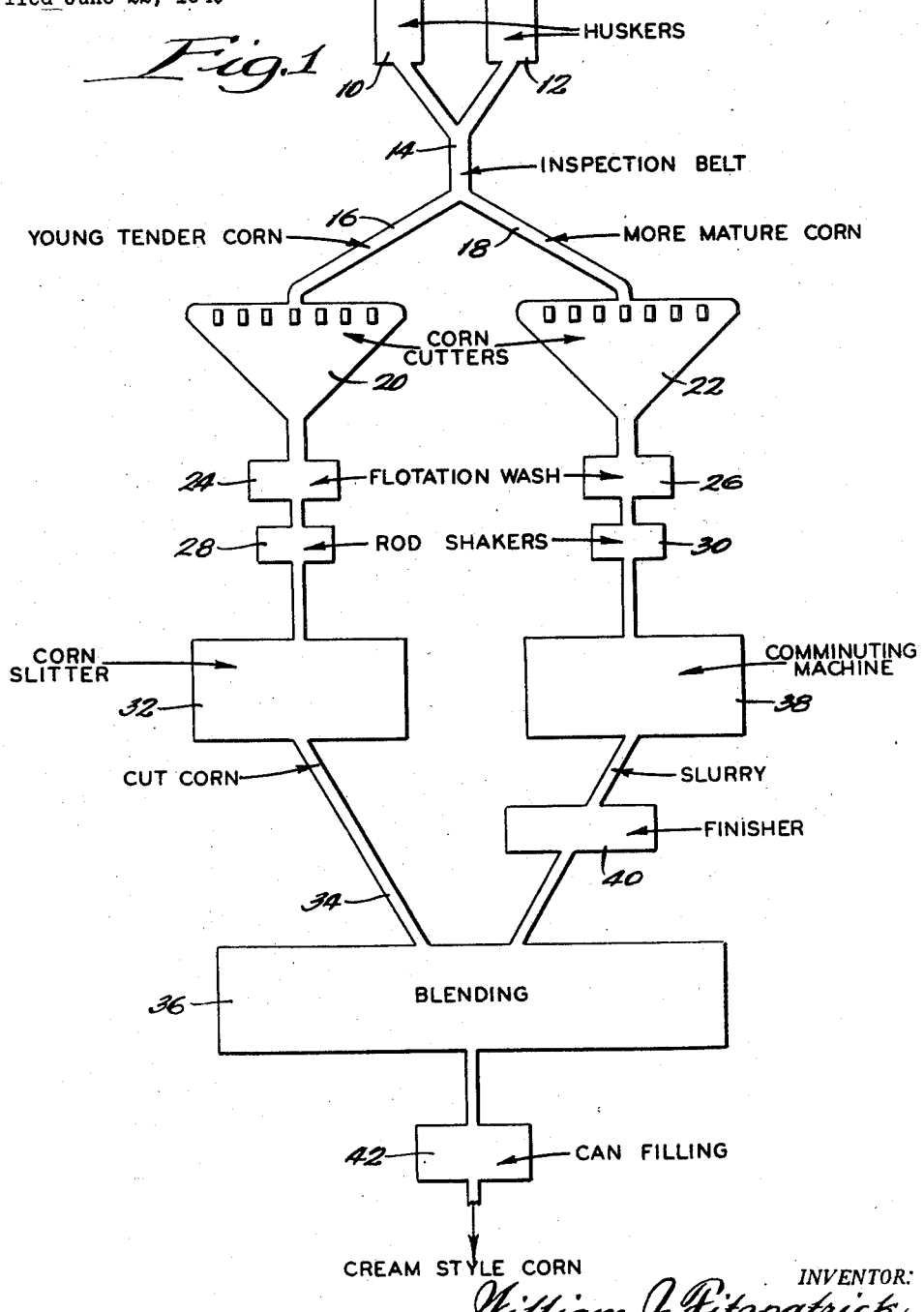

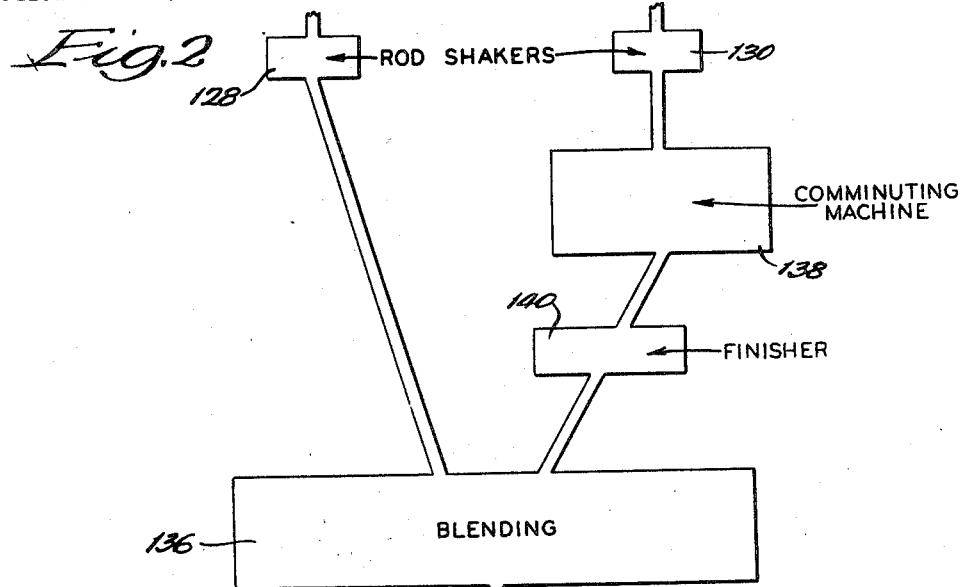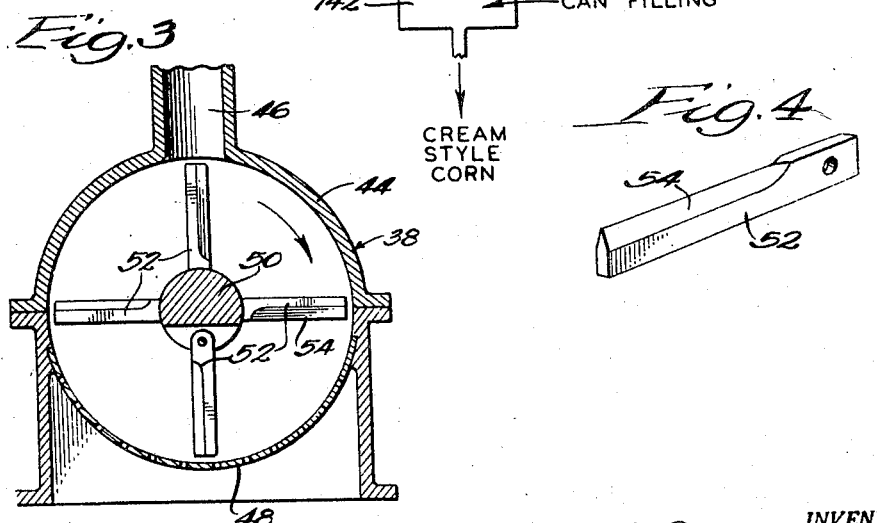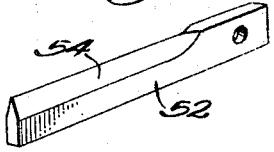

2,540,028

UNITED STATES PATENT OFFICE 2,540,028

METHOD OF MAKING CREAM STYLE CORN

William J. Fitzpatrick, Chicago, Ill.

Application June 22, 1949, Serial No. 100,571

4 Claims. (Cl. 99—186)

This invention relates to a method of making cream style corn and particularly to a corn of improved flavor free from contamination.

In the conventional process of making cream style corn, the tops of the kernels are cut from the cob and the cob is then scraped to produce a cream or slurry. In this process the scraping carries into the cream portions of corn borer, corn silks and other foreign materials which contaminate the product and have a deleterious effect on its flavor.

It is one of the objects of the present invention to provide a method of making cream style corn in which all contamination and foreign material is eliminated thus resulting in a clean product of improved flavor.

Another object is to provide a method of making cream style corn in which the hard parts of the kernel husks are eliminated.

The above and other objects and advantages of the invention will become more readily apparent from the following description and by reference to the accompanying drawing, in which:

Figure 1 is a flow chart diagrammatically illustrating one method embodying the invention;

Figure 2 is a partial flow chart illustrating a modified method;

Figure 3 is a partial section through a comminuting machine for carrying out one step of the method, and Figure 4 is a perspective view of a comminuting machine blade.

In carrying out the method according to the embodiment of Figure 1, ears of corn of a suitable canning grade and which may be of varying degrees of maturity are delivered to the huskers 10 and 12. These units remove the husks from the ears and deliver the husked ears to an inspection belt 14.

The inspection belt 14 travels at relatively low speed to permit inspectors to observe the condition of the ears of corn and remove any obviously defective ears. Since this inspection is limited to defects observable as the belt travels, it is superficial and fails to remove ears having small or internal defects such as might be due to limited corn borer infection.

The ears on belt 14 are segregated in accordance with their size and age, the ears of young tender corn being placed on belt 16 and the ears of more mature corn being placed on belt 18. These separate components of the corn are then treated individually as described hereafter.

The young tender corn is sufficiently young and tender to produce palatable tender whole kernels. The more mature corn comprises the ears having larger, tougher, kernels that would not form a palatable component of the cream style corn if in whole kernel form.

The ears of corn on conveyors 16 and 18 are fed to separate sets of corn cutters 20 and 22. These cutters include elements continuously operative to cut the corn kernels at their base portions, thereby separating whole kernels from the ears and forming a mass of whole kernels.

The masses of whole kernels from cutters 20 and 22 are delivered to the flotation washers 24 and 26 respectively. In these washers the kernels are washed in a bath of water where any form of infestation, defective kernels, silks and other foreign material tends to rise to the top of the washing tank where it may be removed separately from the kernels.

Following the flotation wash, the kernels travel to rod shakers 28 and 30. These subject the kernels to vibratory forces which remove surplus moisture and tend to shake out any worms and other foreign particles that may not have been removed in the flotation tank.

It will be observed that both the flotation tank and rod shakers operate on the mass of separated kernels and do not rely on visible imperfections for removal of the contamination. Moreover, each of these is effective to remove contamination from kernels of corn without rejecting other sound kernels of the same ear.

The young tender kernels, upon leaving the rod shaker 28, are received by the corn slitter indicated at 32. The structure of this machine is fully described and claimed in my co-pending application Ser. No. 40,896, filed July 27, 1948, of which this application is a continuation-in-part. Briefly it includes knives operable to cut the kernels of young, tender corn to varying sizes in accord with the size distribution desired in the kernels of cream style corn. The resultant cut corn is applied to conveyer 34 from which it travels to the blending equipment 36.

The more mature corn, upon leaving the rod shaker 30, is received by the comminuting machine 38. This machine breaks down these kernels to a small size to form a milky slurry or cream of corn fluid and particles of kernels. If desired, excess hulls may be removed in the finisher 40. The resultant slurry is then conveyed to the blending equipment 36.

In blending equipment 36, the slurry and the cut young tender kernels are mixed in proportions to give a resultant mixture simulating that achieved by conventional processes and have salt, sugar and other desired flavorings added. The blended mixture is then heated and travels to can filling equipment 42 where it is canned as cream style corn.

While the product produced by the foregoing process superficially resembles cream style corn prepared in the conventional manner and may be so marketed and sold, it differs materially from conventional cream style corn and is in reality an improved quality cream style corn. In the corn produced in accord with the present process, the nibs or cut up kernels are from the young tender corn and generally constitute more nearly the entire kernels than do the nibs of conventional cream style corn. This results in a more palatable and attractive product than conventional cream style corn since the nibs of more nearly whole kernels of young tender corn are far more desirable than nibs of small portions of more mature corn. However, since the more mature corn forms an effective slurry, the process of the present invention does not waste this corn but instead uses it for the purpose in which it is most suitable, thus increasing the yield of the process.

Moreover, the larger particles in cream style corn manufactured by existing processes are the particles of more mature corn and the young tender corn tends to contribute to the slurry. This is in contrast to the present process in which young tender corn makes up the particles and the more mature corn makes the slurry.

The comminuting machine 38 is illustrated more particularly in Figs. 3 and 4 and may be a machine as described and claimed in the patent to Magnus No. 2,348,916. As shown the machine comprises a cylindrical housing 44 having an inlet opening 46 at its top and having its lower wall portion formed by a perforated plate or screen 48. A rotor 50 is axially mounted in the housing and has a series of relatively thin blades 52 pivoted thereto. The blades 52 have their leading edges sharpened as shown at 54.

I have found that when the kernels are comminuted by blunt blades or by other conventional processes the hulls are broken up and bruised. These hulls and particularly the lower hard nibs thereof have a relatively strong cob flavor which is released by the bruising action and carried into the cream or slurry with a detrimental effect on the flavor of the product.

By using relatively thin sharpened blades the kernels are cut repeatedly so that the cream, starches and all internal parts of the kernel are released but the harder parts of the hull are not bruised and are not reduced to the same degree of fineness as in conventional machines. The pieces of hull are removed in the finisher 40 taking with them the undesirable cob flavor and leaving a smooth tasty cream.

Figure 3 illustrates a variation of the process of Fig. 1 employing the same apparatus and parts of which corresponding identical parts in Fig. 1 have been indicated by the same reference numerals plus 100. According to this method the cream or slurry from the comminuting machine 138 and the finisher 140 goes into the blender 136 and the whole young kernels from the rod shaker 128 also go directly into the blender. In the blender, salt, sugar and other desired flavorings are added together with some water, if desired, and the mixture is heated.

The heating has the effect of setting up or solidifying the cream or starch components in the kernels so that they become firmer than the raw kernels. The heated mixture then passes through the slitter 132 where the whole young kernels are slit to the desired size. However, due to solidification of the kernels by heating and the lubrication provided by the cream or slurry it has been found that the kernels cut cleanly with no tendency to crush to produce a highly desirable product.

While two alternative methods for carrying out the invention have been described in detail it will be apparent that other variations within the scope of the invention might be devised. It is, therefore, not intended that the invention be limited to the exact details of the described methods nor otherwise than by the terms of the appended claims.

What is claimed is:

1. The method of making cream style corn free from contamination which comprises cutting whole kernels from ears of corn, cleaning the kernels to remove contamination and foreign materials therefrom, comminuting a portion of the cleaned kernels to form a creamy slurry therefrom, slitting the remaining kernels to sizes varying in accordance with the desired kernel sizes in the cream style corn, and mixing the slitted kernels with the slurry.

2. The method of making cream style corn free from contamination which comprises cutting whole kernels from ears of corn, cleaning the kernels to remove contamination and foreign materials therefrom, comminuting a portion of the kernels to form a creamy slurry therefrom, mixing the remaining whole kernels with the slurry, and slitting the whole kernels in the mixture.

3. The method of making cream style corn free from contamination which comprises cutting whole kernels from ears of corn, cleaning the kernels to remove contamination and foreign materials therefrom, comminuting a portion of the kernels to form a cream slurry therefrom, mixing the remaining whole kernels with the slurry, heating the mixture, and slitting the whole kernels in the heated mixture.

4. The method of making cream style corn free from contamination which comprises separating ears of young tender corn from ears of more mature corn, separately cutting the whole kernels from the ears of young tender corn and from the ears of more mature corn, separately cleaning the kernels of young tender corn and of more mature corn to remove contamination and foreign material therefrom, comminuting the kernels of more mature corn to form a creamy slurry, mixing the kernels of young tender corn to the slurry, heating the mixture, and slitting the kernels of young tender corn in the heated mixture.

WILLIAM J. FITZPATRICK.

REFERENCES CITED

The following references are of record in the file of this patent:

UNITED STATES PATENTS

| Number | Name | Date |
|---|---|---|
| 1,477,502 | Killick | Dec. 11, 1923 |
| 2,000,892 | Lewis | May 7, 1935 |